(12) United States Patent
Clough et al.

(10) Patent No.: US 7,387,342 B1
(45) Date of Patent: Jun. 17, 2008

(54) SEAT ARMREST

(76) Inventors: Robert Clough, 15263 Saddleback Rd., Canyon Country, CA (US) 91381; Roberto E. Arance, 26870 Claudette St. #701, Santa Clara, CA (US) 91351

( * ) Notice: Subject to any disclaimer, the term of this patent is extended or adjusted under 35 U.S.C. 154(b) by 0 days.

(21) Appl. No.: 11/787,122

(22) Filed: Apr. 13, 2007

(51) Int. Cl.
*A47C 7/54* (2006.01)
(52) U.S. Cl. .................................. 297/411.36
(58) Field of Classification Search .......... 297/411.36, 297/411.35
See application file for complete search history.

(56) References Cited

U.S. PATENT DOCUMENTS

| | | | |
|---|---|---|---|
| 3,874,480 A | 4/1975 | Porter et al. | |
| 4,400,033 A | 8/1983 | Pietsch | |
| 4,907,835 A | * 3/1990 | Salters | 296/1.09 |
| 5,795,025 A | * 8/1998 | Murphy | 297/411.36 |
| 5,795,026 A | * 8/1998 | Dral et al. | 297/411.36 |
| 6,132,001 A | * 10/2000 | Su | 297/411.36 |

\* cited by examiner

*Primary Examiner*—Milton Nelson, Jr.

(57) ABSTRACT

A vertically adjustable armrest that is suitable for use in connection with various types of passenger vehicles, including commercial aircraft. The armrest includes a slide mechanism for permitting easy height adjustment of the armrest and also includes a locking mechanism for securely locking the headrest in the desired elevated position. The armrest moves in a smooth vertical motion and is continuously biased toward an upraised position. Vertical adjustment of the armrest is accomplished by pushing a push button located in the upper portion of the armrest.

20 Claims, 6 Drawing Sheets

SEAT ARMREST

BACKGROUND OF THE INVENTION

1. Field of the Invention

The present invention relates generally to armrests for seats. More particularly, the invention concerns a vertically adjustable armrest for use in connection with furniture and with passenger vehicles such as aircraft, trains and busses.

2. Discussion of the Prior Art

Various types of seat armrests for use in passenger vehicles have been suggested in the past. As a general rule, these armrests are fixedly mounted to either the seat or back portion of the seat. In those instances where the armrests are adjustable, the armrest is typically pivotally mounted to the seat back in a manner to enable the armrest to be pivoted along an arcuate path from a downward operational position into a retracted, stowed position.

On occasion, attempts have been made to develop self-leveling chair arms for use in theaters and the like. An example of one such attempt is disclosed in U.S. Pat. No. 4,400,033 issued to Pietsch. This patent concerns a theatre, or stadium chair having a seat, a seat back and an arm connected to the seat back by means of a parallelogram linkage. With this arrangement, when the seat back pivots the arm stays essentially parallel to the seat.

As a general rule, prior art self-leveling armrests as well as other prior art adjustable armrests of similar complexity have been proven to be impractical for use in vehicles. For the most part, such prior art adjustable armrests are difficult to manufacture, are of relatively high cost and are of questionable reliability. Accordingly, there has been a long felt need for an easy-to-use adjustable armrest that is of a simple construction, one that can be manufactured for reasonable cost and one that can be safely used in vehicle applications, including commercial aircraft applications. The thrust of the present invention is to provide such an adjustable armrest.

SUMMARY OF THE INVENTION

It is an object of the present invention to provide a vertically adjustable armrest that provides both support and comfort to the user and one that is suitable for use in connection with various types of passenger vehicles, including commercial aircraft.

Another object of the invention is to provide an armrest of the aforementioned character that operates in a smooth vertical motion and one that can be stopped at any desired elevated position.

Another object of the invention is to provide an adjustable armrest of the character described in the preceding paragraph that includes slide means for permitting easy height adjustment of the armrest and also includes locking means for securely locking the armrest in the desired elevated position.

Another object of the invention is to provide an armrest construction of the class described that is of a simple, compact construction, one that is highly reliable in operation, requires minimum maintenance and one that can be inexpensively produced and easily installed.

DESCRIPTION OF THE INVENTION

Figure 1:
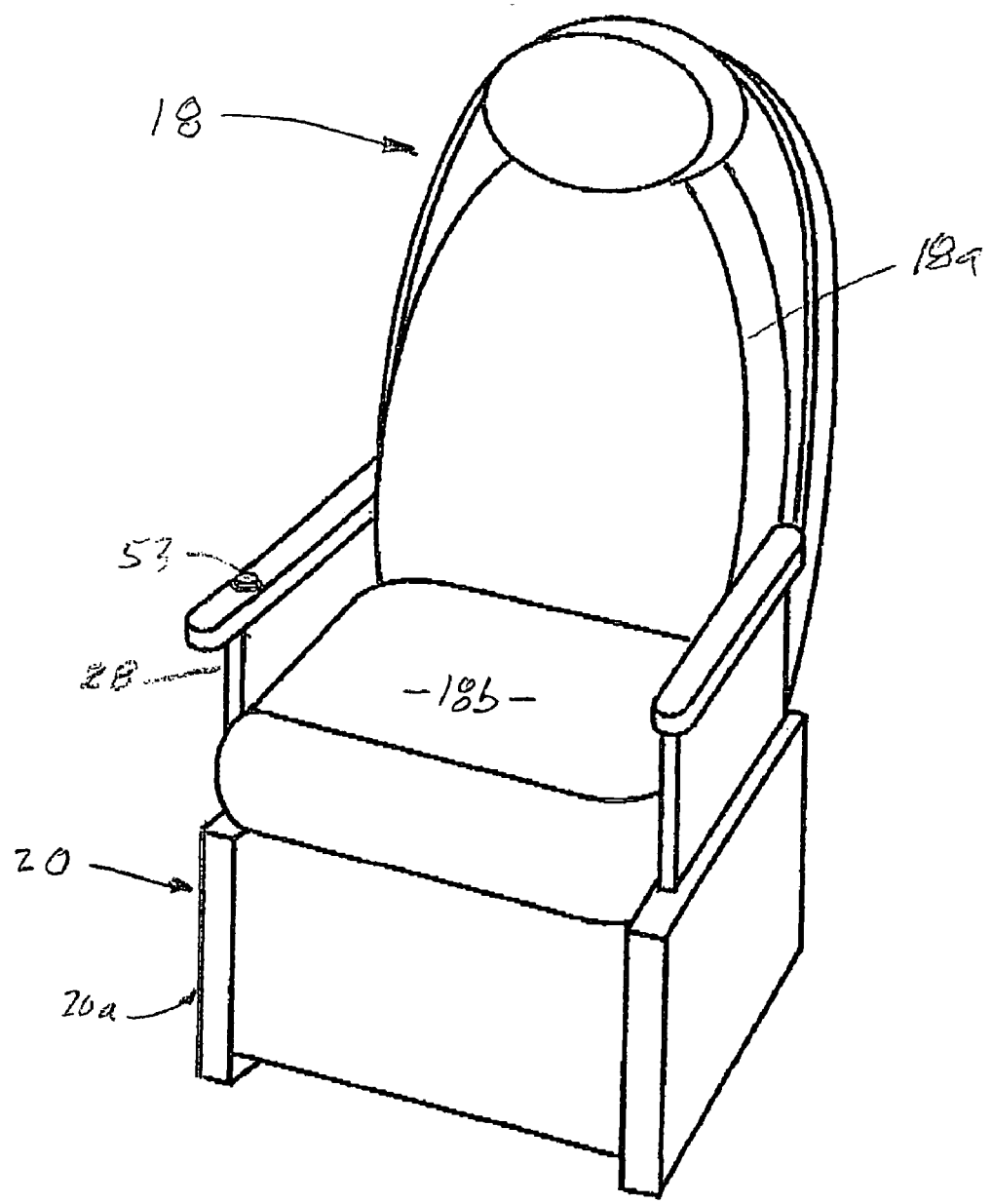
FIG. 1 is a generally perspective view of one form of the seat armrest apparatus of the invention as it appears when interconnected with a seating unit.
Figure 6:
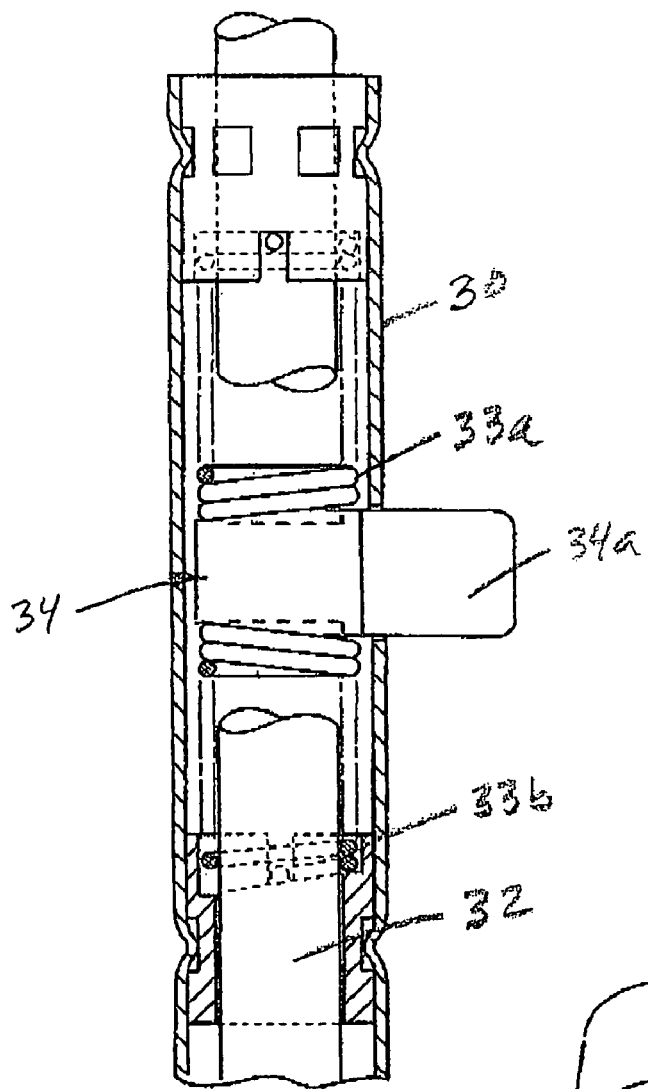
FIG. 6 is a cross-sectional view of the linear locking device of the assembly shown in FIG. 2A.
Figure 7:
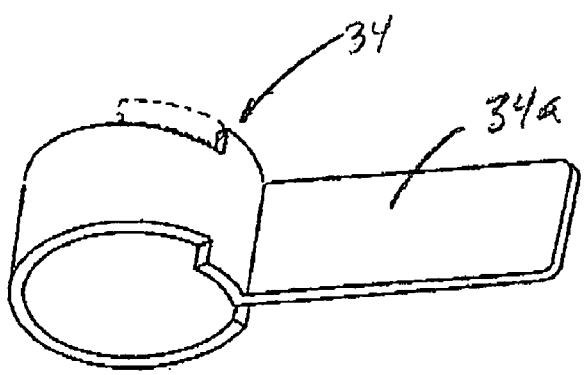
FIG. 7 is a generally perspective view of the spring release mechanism of the linear locking device shown in FIG. 6.

Referring to the drawings and particularly to FIG. 1, one form of the seating unit of the present invention is there shown and generally designated by the numeral 18. Seating unit 18, here depicted as an airplane seat, comprises a back portion 18a, a seat portion 18b and vertical side structure 20 of the character illustrated in FIGS. 2 and 3 of the drawings. Connected to one side 20a of the side structure 20 is the linear locking device of the apparatus, here shown as a friction brake mechanism 24 (FIGS. 2A, 3 and 6). Connected to the opposite side 20b of the side structure is a linear bearing 26 (FIGS. 2, 3, 4 and 4A).

In a manner presently to be described, a vertically adjustable armrest 28 is operably interconnected with the friction brake mechanism 24 and with the linear bearing 26. With this construction, vertical motion of the armrest is controlled by linear bearing 26, while position control of the armrest is provided by the friction brake mechanism 24.

The linear locking device, or brake mechanism 24, which is readily commercially available from several sources, including the P. L. Porter Company of Burbank, Calif., comprises a hollow housing 30 and an elongated, vertically extending rod 32 that is slidably mounted within the housing. The brake mechanism 24 here comprises first and second coiled springs 33a and 33b that are tightly wound on the rod 32 and are fixed against axial movement relative to the housing (FIG. 6). A release collar 34 is provided for acting upon the springs, thereby relaxing their grip on the rod 32 and allowing vertical movement of the housing 30 along the rod 32. As will be discussed in greater detail hereinafter, release collar 34 forms a part of the novel release mechanism of the invention for partially unwinding the springs so that the housing 30, along with the armrest 28 can be vertically adjusted. It is to be noted that if the rod is pushed before the springs are unwound, the springs will grip the rod even more tightly to prevent vertical movement of the housing 30 and the armrest 28. Uniquely, brake mechanism 24 has one maximum stroke setting that can lock at any position within the travel range of the housing and has positive locking capabilities in both directions.

As indicated in FIG. 6, the distal ends of the coiled springs 33a and 33b are fixed within the housing 30. Thus, when the release mechanism is actuated causing a force to be exerted on the actuating lever 34a of the collar 34, the distal ends of the springs cannot be moved about the axis of the rod and the force imparted to the springs by the collar 34 will cause them to unwind and release their grip on the rod. However, when the actuating force on the lever 34a is released, the springs will immediately return to their gripping positions on the rod.

In the present form of the invention, the release mechanism also includes a release cable system 34b, the operation of which causes an operating force to be exerted on the actuating lever 34a of the collar 34. The details of the construction and operation of the release cable system 34b will presently be described. For a more complete understanding of the construction and operation of the brake mechanism, the P. L. Porter Company should be contacted. Alternatively, reference should be made to U.S. Pat. No. 3,874,480 issued to Porter et al, and entitled Friction Brake Mechanism. U.S. Pat. No. 3,874,480 is hereby incorporated by reference as though fully set forth herein.

Linear bearing 26 is a conventional type of linear motion device that allows motion and positioning along a linear axis. While various types of linear bearings are suitable for the present application, a linear bearing manufactured and sold by IKO Nippon Thompson Co. Ltd. of Tokyo, Japan has proven satisfactory.

Figure 2:
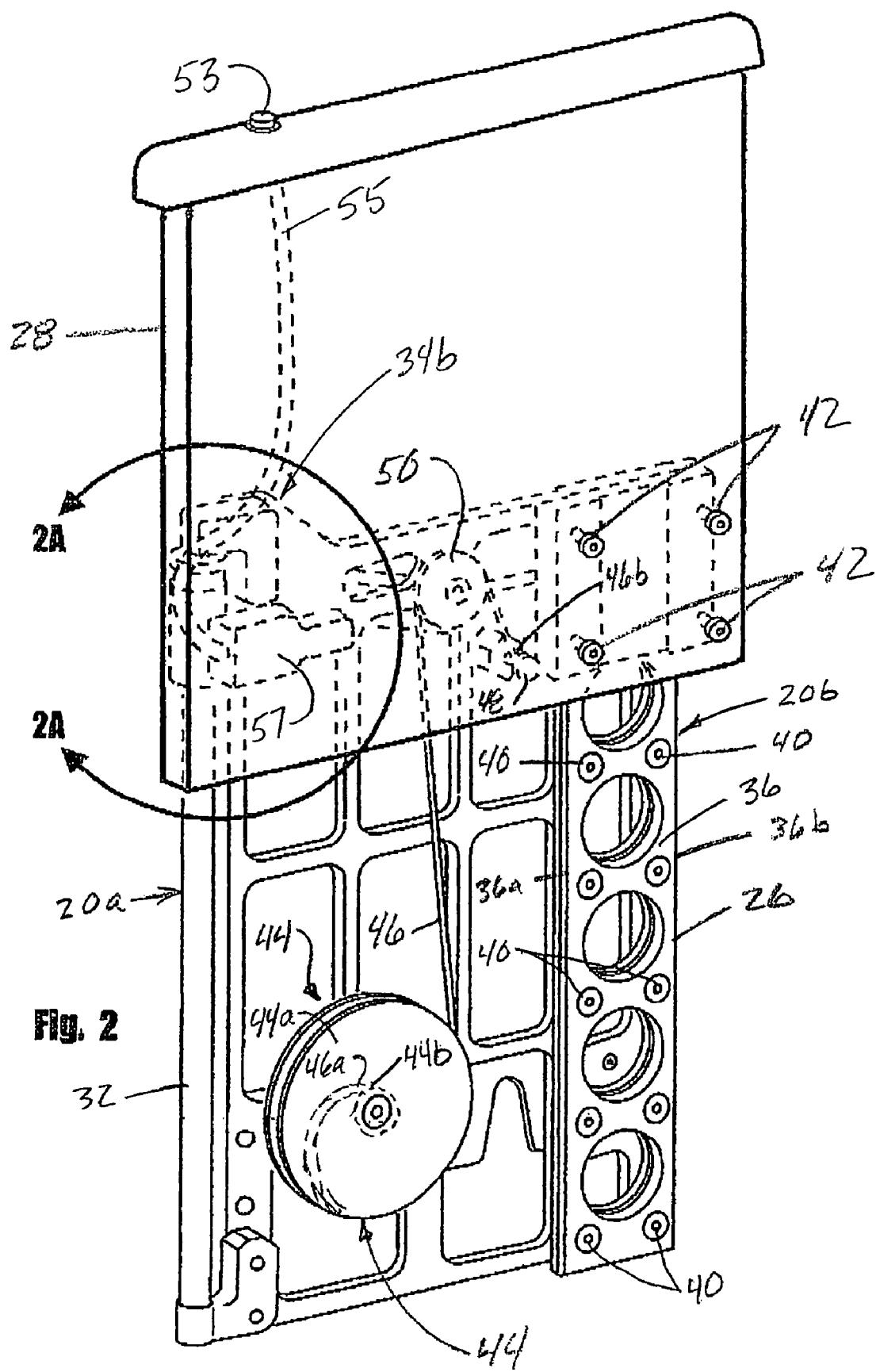
FIG. 2 is a generally perspective view of one side of a one form of the seat armrest assembly of the present invention.
Figure 2A:
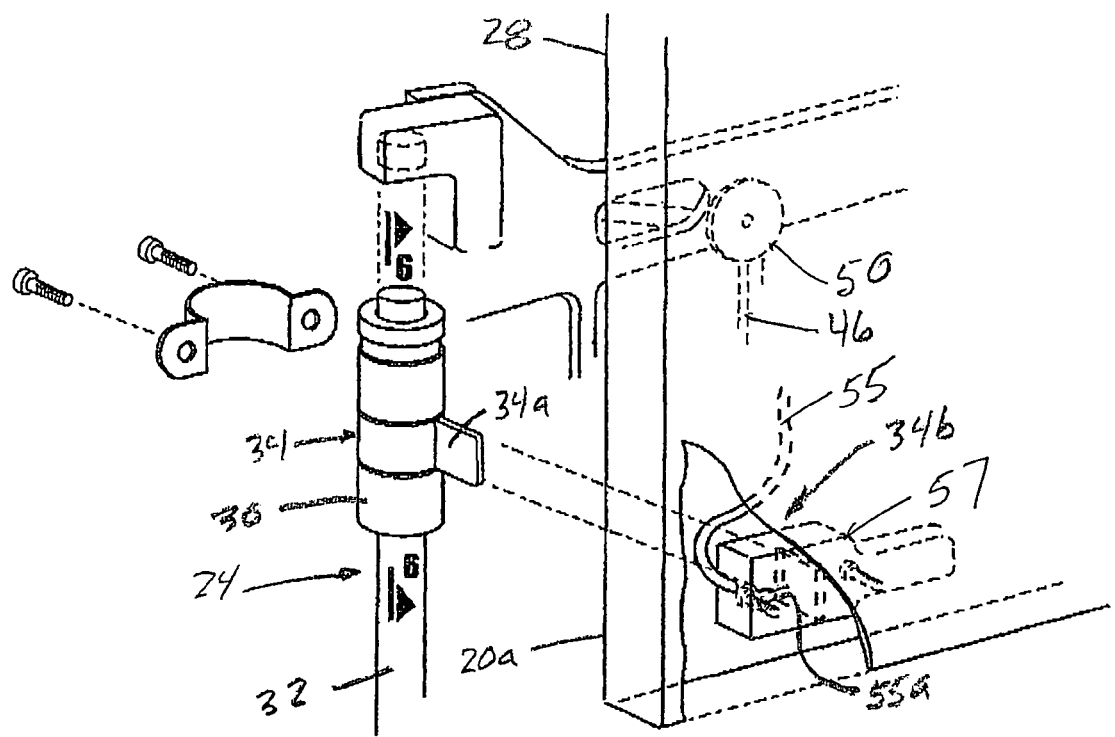
FIG. 2A is a greatly enlarged, generally perspective, exploded fragmentary view of the area designated in FIG. 2 as 2A-2A.
Figure 3:
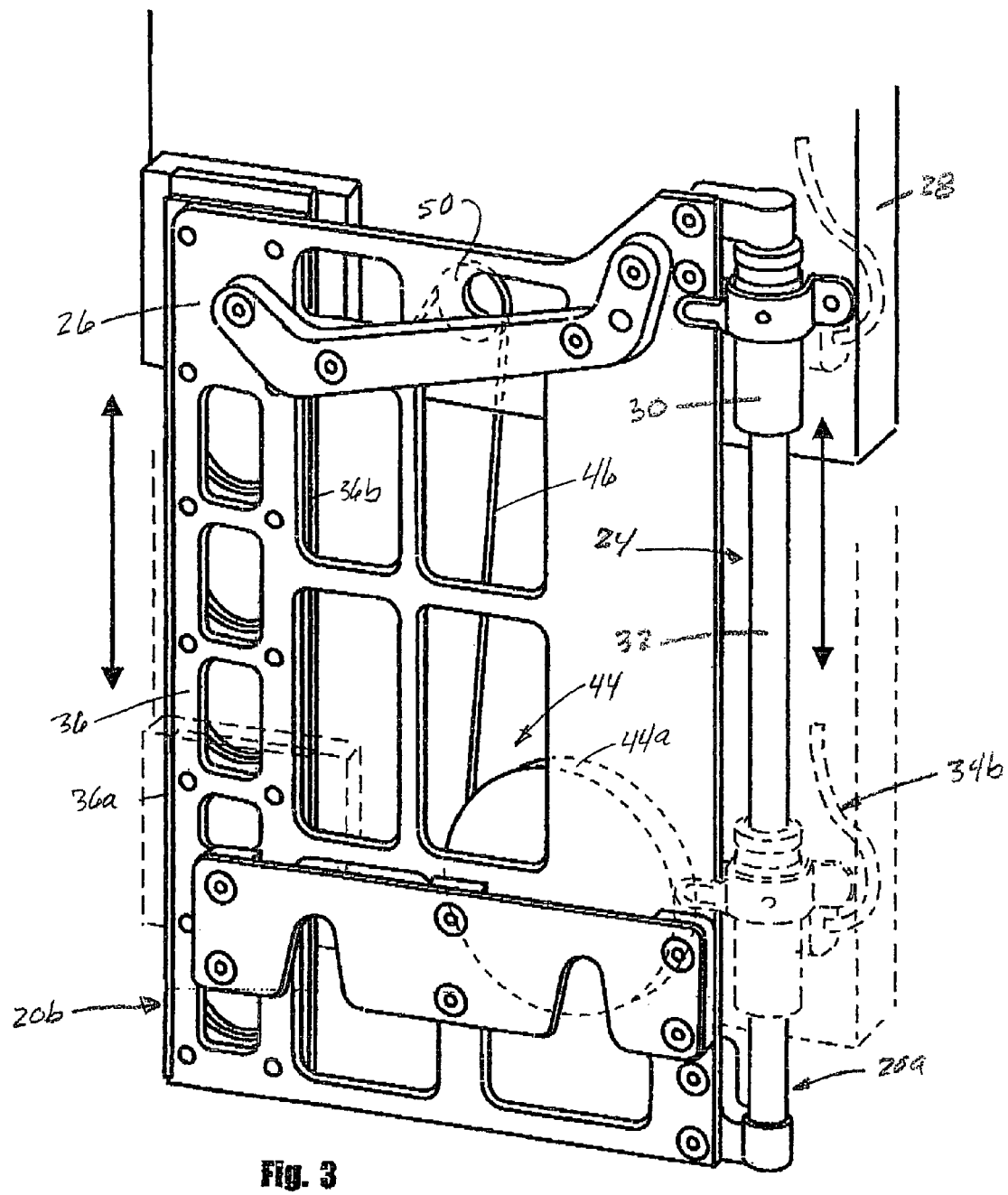
FIG. 3 is a generally perspective view, similar to FIG. 2, but showing the opposite side of the seat armrest shown in FIG. 2.
Figures 4, 4A, 5:
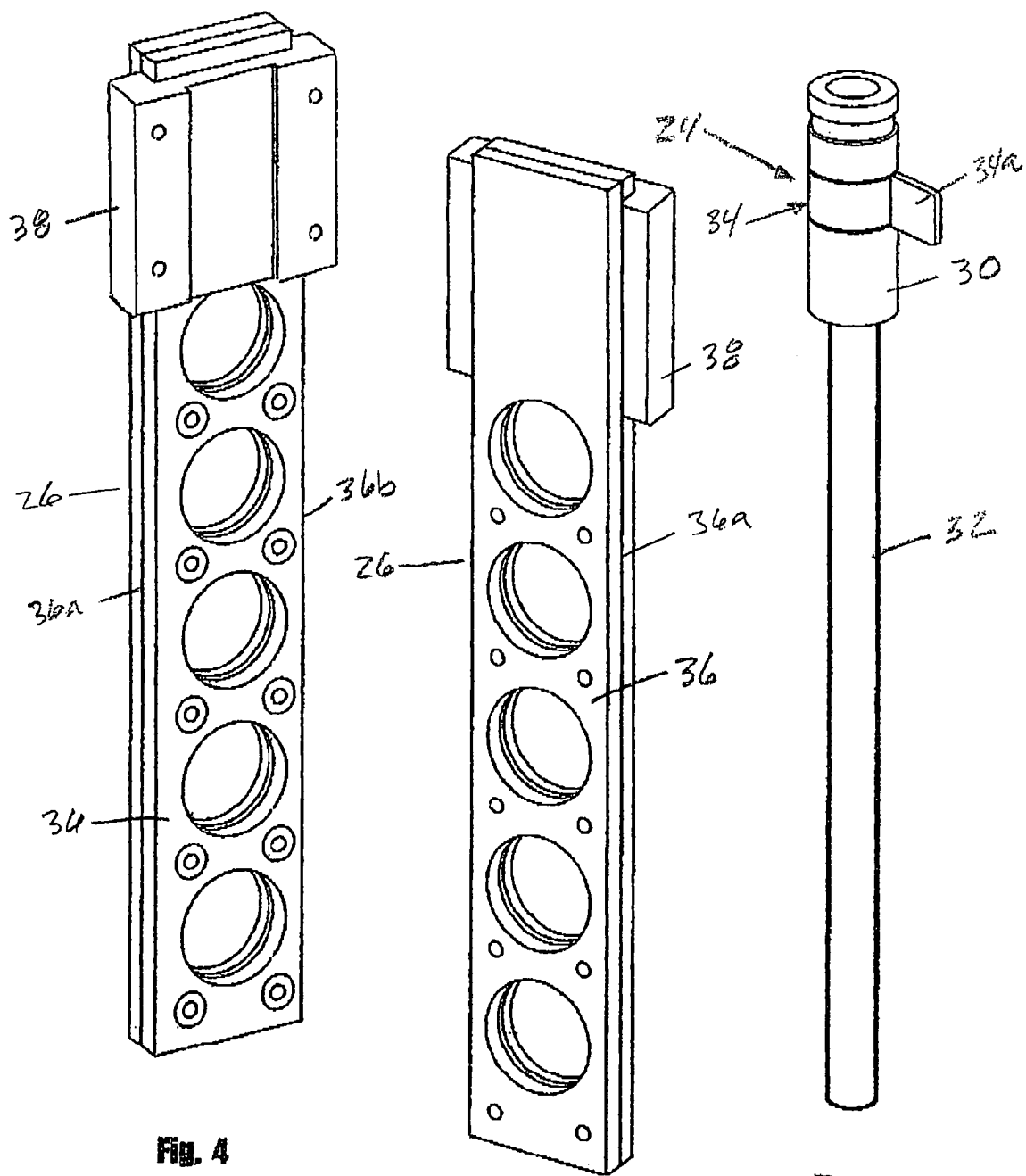
FIG. 4 is a generally perspective view of one side of the linear bearing mechanism of the seat armrest assembly.
FIG. 4A is a generally perspective view, similar to FIG. 4, but showing the opposite side of the linear bearing mechanism of the seat armrest assembly.
FIG. 5 is a fragmentary, cross-sectional view of one form of the linear locking device of the assembly shown in FIGS. 1, 2 and 3 of the drawings.

As best seen by referring to FIG. 2 of the drawings, linear bearing 26 here comprises a vertical slide member 36 and a carriage 38 that is connected to slide member 36 for vertical movement along a pair of spaced-apart tracks 36a and 36b between an upraised position shown by the solid lines in FIG. 3 and a lowered position shown by the dotted lines in FIG. 3. Vertical slide member 36 is interconnected with the vertical side structure 22 by a plurality of spaced-apart threaded connector bolts 40 (FIG. 2), while carriage 38 is interconnected with the adjustable armrest by means four spaced-apart threaded connector bolts 42.

Also connected to vertical side structure 22 is biasing means for continuously urging armrest 28 toward its upraised position. This biasing means is here provided in the form of a conventional, commercially available reel-type torsion spring assembly 44 that includes a reel housing 44a, a torsion spring 44b mounted within the housing and elongated, retractable, reel cable 46 having a first end 46a interconnected with the torsion spring 44b and a second end 46b connected to side structure 22 by means of a suitable cable anchor 48 (FIG. 2). As best seen in FIG. 2 of the drawings, reel cable 46 is entrained over an idler pulley 50 that is rotatably connected to side structure 22 and also forms a part of the biasing means of the invention.

In use, the armrest 28 is maintained in the upper, normal operating position shown in FIG. 1 by the previously described biasing means. When it is desired to move the armrest into a lowered position a downward pressure is exerted on a pushbutton 53 that is mounted on the upper portion of the armrest (FIG. 1). Pushbutton 53, which, along with release collar 34, forms apart of the release mechanism of the invention, is operably associated with a conventional release cable mechanism 55 that is carried within the armrest 28 and also forms a part of the release mechanism of the invention. As indicated in FIG. 2A of the drawings, the distal end 55a of the internal cable of the release cable mechanism 55 is received with a release housing 57 that also forms a part of the release mechanism 34. Also received with release housing 57, in a manner indicated by the dotted lines and FIG. 2A, is the release lever 34a of the collar 34. With this construction, the force exerted on the cable of the release cable mechanism 55 by exerting a downward pressure on the pushbutton 53 will, in a manner well understood by those skilled in the art, cause the cable to exert pressure on the release lever 34a causing it to move into the release position. As the release lever moves into the release position, the coiled springs 33a and 33b will be caused to unwind and release their grip on the rod 32.

With the release lever in the release position, a downward force exerted on the armrest will cause the armrest to move freely downwardly. However, as previously discussed, if pressure on the pushbutton is removed, the release lever 34a will return to its locking position causing the torsion springs 33a and 33b to once again securely grip rod 32 and thereby prevent further downward movement of the armrest.

During the downward movement of the armrest, the reel cable 46 will be wound about the drum of the torsion spring assembly 44 so that, with the armrest in a downward position, a pressure exerted on the pushbutton will exert pressure on the release lever 34a causing it to move into the release position and thereby permit the armrest to automatically return to its upraised position due to the urging of the torsion spring 44a of the torsion spring assembly 44.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A vertically adjustable armrest assembly comprising:
   (a) a support structure;
   (b) a linear bearing connected to said support structure comprising:
      (i) a slide member; and
      (ii) a carriage connected to said slide member for movement relative to said slide member between an upraised position and a lowered position;
   (c) a friction brake mechanism connected to said support structure comprising:
      (i) an elongated, vertically extending rod connected to said support structure; and
      (ii) a housing slidably connected to said rod for movement between an upraised position and a lowered position; and
   (d) an armrest interconnected with said carriage and with said housing of said friction brake mechanism.

2. The assembly as defined in claim 1 further including biasing means connected to said support structure and operably associated with said armrest for continuously urging said armrest toward said upraised position.

3. The assembly as defined in claim 1 in which said support structure has first and second spaced-apart side portions and in which said friction brake mechanism is connected to said first side portion and in which said slide member is connected to said second side portion.

4. The assembly as defined in claim 1, in which said friction brake mechanism further comprises:
   (a) first and second coiled springs wound upon and in gripping engagement with said rod; and
   (b) a release mechanism carried by said rod and operably associated with said springs for causing said first and second coiled springs to release their grip on said rod.

5. The assembly as defined in claim 1 in which said slide member includes a pair of spaced-apart tracks for guiding vertical travel of said carriage between said upraised position and said lowered position.

6. A vertically adjustable armrest assembly comprising:
   (a) a support structure having first and second spaced-apart portions;
   (b) a friction brake mechanism connected to said first portion of said support structure, said friction brake mechanism comprising:

(i) an elongated, vertically extending rod connected to said support structure;

(ii) a housing slidably connected to said rod for movement between an upraised position and a lowered position; and (iii) first and second coiled springs carried within said housing, said first and second coiled springs being wound upon and in gripping engagement with said rod;

(c) a linear bearing connected to said second portion of said support structure, said linear bearing comprising:

(i) a slide member; and (ii) a carriage connected to said slide member for movement relative to said slide member between an upraised position and a lowered position;

(d) an armrest interconnected with said carriage and with said housing of said friction brake mechanism; and (e) biasing means connected to said support structure and operably associated with said armrest for continuously urging said armrest toward said upraised position.

7. The assembly as defined in claim 6, in which said biasing means comprises a reel-type torsion spring assembly carried by said support structure.

8. The assembly as defined in claim 6, in which said slide member includes a pair of spaced-apart tracks for guiding vertical travel of said carriage between said upraised position and said lowered position.

9. The assembly as defined in claim 6 in which said friction brake mechanism further includes a release mechanism for partially unwinding said springs to permit vertical adjustment of said armrest.

10. The assembly as defined in claim 9, in which said release mechanism comprises a collar carried by said rod, said collar having a release lever.

11. The assembly as defined in claim 9, in which said release mechanism comprises a push button carried by said armrest.

12. The assembly as defined in claim 11, in which said release mechanism further comprises a release cable system carried by said support structure and operably associated with said push button.

13. The assembly as defined in claim 12, in which said release mechanism further comprises a release housing carried by said support structure for receiving a release lever of a collar, said release cable system being connected to said release housing.

14. A vertically adjustable armrest assembly comprising:

(a) a support structure having first and second spaced-apart portions;

(b) a friction brake mechanism connected to said first portion of said support structure, said friction brake mechanism comprising:

(i) an elongated, vertically extending rod connected to said support structure;

(ii) a housing slidably connected to said rod for movement between an upraised position and a lowered position;

(iii) first and second coiled springs carried within said housing, said first and second coiled springs being wound upon and in gripping engagement with said rod; and (iv) a release mechanism carried by said support structure for partially unwinding said springs to permit vertical adjustment of said armrest assembly;

(c) a linear bearing connected to said second portion of said support structure, said linear bearing comprising:

(i) a slide member; and (ii) a carriage connected to said slide member for movement relative to said slide member between an upraised position and a lowered position;

(d) an armrest interconnected with said carriage and with said housing of said friction brake mechanism; and (e) biasing means connected to said support structure and operably associated with said armrest for continuously urging said armrest toward said upraised position, said biasing means comprising a reel housing connected to said support structure, a torsion spring mounted within said reel housing and an elongated, retractable, reel cable having first and second ends, said first end being interconnected with said torsion spring.

15. The assembly as defined in claim 14, in which said biasing means further comprises a cable anchor connected to said support structure, said second end of said reel cable being connected to said cable anchor and a reel-type torsion spring assembly carried by said support structure.

16. The assembly as defined in claim 14, in which said release mechanism comprises a collar carried by said rod, said collar having a release lever.

17. The assembly as defined in claim 16, in which said release mechanism comprises a push button carried by said armrest.

18. The assembly as defined in claim 17, in which said release mechanism further comprises a release cable system carried by said support structure and operably associated with said push button.

19. The assembly as defined in claim 18, in which said release mechanism further comprises an idler pulley carried by said support structure and operably associated with said release cable system.

20. The assembly, as defined in claim 19, in which said release mechanism further comprises a release housing carried by said armrest for receiving said release lever of said collar, said release cable system being connected to said release housing and to said push button.

* * * * *